United States Patent Office 3,268,542
Patented August 23, 1966

3,268,542
CERTAIN ARYLENEPOLY-1,3,2,4-DIOXATHIA-
ZOLE OXIDE COMPOUNDS
Emmett H. Burk, Jr., Glenwood, Ill., and Donald D.
Carlos, Gary, Ind., assignors to Sinclair Research, Inc.,
New York, N.Y., a corporation of Delaware
No Drawing. Filed July 13, 1965, Ser. No. 471,714
6 Claims. (Cl. 260—301)

The present invention is directed to a new class of organic compounds. More specifically, the invention is directed to aromatic poly (nitrile sulfites), including di (nitrile sulfites), which can be represented by the following structure:

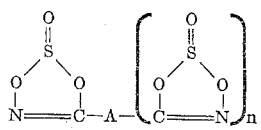

wherein A is an aromatic hydrocarbon radical of 1 to 3 aromatic rings and $n$ is an integer of 1 to 3, preferably 1 to 2. The aromatic hydrocarbon, A in the structure, often contains a total of 6 to about 30 carbon atoms or more, preferably 6 to 12 carbon atoms. The aromatic hydrocarbon, A in the above structure, can also be substituted with non-interfering groups. At least two of the nitrile groups of the compounds of the present invention are attached to aromatic rings of the aromatic hydrocarbon A, and the nitrile sulfite groups may be attached to the same or different aromatic rings of aromatic hydrocarbon A. Thus, the novel compounds of the invention include the poly (nitrile sulfites) of, for instance, benzene, toluene, naphthalene, anthracene, phenylbenzene, phenylnaphthalene, diphenylalkylenes such as diphenylmethylene, diphenylethylene (stilbene), etc., dinaphthylalkylene and like aromatic hydrocarbons.

The aromatic poly (nitrile sulfites) of the present invention, are valuable intermediates or precursors for the preparation of highly desired chemicals. For example, the poly (nitrile sulfites) can be thermally decomposed to polyisocyanates. Polyisocyanates, such as diisocyanates, have found extensive use in the preparation of high molecular weight polymers by reaction of the polyisocyanates with polymerizable organic compounds such as compounds with terminally active hydroxy and amine groups. Polyurethanes, for instance, are commonly prepared by the reaction of diisocyanates and polybasic alcohols such as the glycols.

The aromatic poly (nitrile sulfites) can also be hydrolyzed with basic materials to the respective amines or acid hydrolyzed to aromatic hydroxamic acids.

Decomposition of the aromatic poly (nitrile sulfite) to the corresponding aromatic polyisocyanates can be effected by simply heating the aromatic poly (nitrile sulfites) below the degradation point of the desired aromatic polyisocyanate product. Since the decomposition reaction is exothermic there is a tendency of the reaction temperature to run away. Means for carrying away or absorbing heat should be used, therefore, to control the temperature below the degradation point of the desired aromatic polyisocyanate product. The heating temperature employed will vary, of course, depending upon the decomposition temperature of the feed and degradation temperature of the particular aromatic polyisocyanates being prepared. In most cases, however, temperature will usually fall in the range of about 50 to 200° C., preferably about 75 to 150° C.

The ability of the aromatic poly (nitrile sulfites) of the invention to generate polyisocyanates upon heating provides an additional advantage to the consumer in that the aromatic poly (nitrile sulfites) of the invention, in contrast to isocyanates, are stable in the absence of water and therefore can be easily handled and stored. Also, since there is no active hydrogen (e.g. in the form of HCl) present in the aromatic poly (nitrile sulfites) of the invention or in the decomposition products formed, to react with the isocyanate when the latter is made, use of the aromatic poly (nitrile sulfites) for the production of polyisocyanates provides a method that does not suffer from the reduced yields and separation and purification problems presented by the by-products obtained from starting materials of commercial methods wherein active hydrogen is present. Use of the aromatic poly (nitrile sulfites) in the preparation of isocyanates, furthermore, provides a process having advantages over commercial methods employing azides in that the former do not have the explosion tendencies of the latter and are more economical.

The aromatic poly (nitrile sulfites) of the invention can be prepared by reacting an aromatic polyhydroxamic acid and thionyl chloride. Aromatic polyhydroxamic acids react with thionyl chloride to produce the novel compounds of the invention which aromatic polyhydroxamic acids can be represented by the structure:

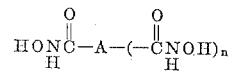

wherein A and $n$ are as defined above in the structure of the aromatic poly (nitrile sulfite) of the invention and preferably wherein the hydroxamic acid groups are in a non-ortho-position on the aromatic ring. Thus, the aromatic poly hydroxamic acid reactants include, for instance, benzopolyhydroxamic acids, naphthopolyhydroxamic acids, anthropolyhydroxamic acids, phenylbenzopolyhydroxamic acids, phenylnaphthopolyhydroxamic acid, diphenylalkylene polyhydroxamic acids and dinaphthylalkylene polyhydroxamic acids. The aromatic hydrocarbon, A, of the polyhydroxamic acid structure can be substituted, if desired, so long as the substituents do not inhibit formation of the poly (nitrile sulfites) of the invention.

Illustrative of aromatic polyhydroxamic acids suitable for use as the reactant in the preparation of the aromatic poly (nitrile sulfites) of the invention are the following:

benzodihydroxamic acids, such as
isophthalodihydroxamic acid and
terephthalodihydroxamic acid;
benzotrihydroxamic acid, such as
1,3,5-benzenetrihydroxamic acid;
benzotetrahydroxamic acid, such as
pyromellitohydroxamic acid, prehnitrotetrahydroxamic
 acid;
1,4-dimethyl-2,5-benzodihydroxamic acid;
1,3-dimethyl-2,4-benzodihydroxamic acid;
2,3-dimethyl-1,5-benzodihydroxamic acid;
methylbenzodihydroxamic acid;
methylbenzotrihydroxamic acid;
ethylbenzodihydroxamic acid, ethylbenzotrihydroxamic
 acid;
hexylbenzodihydroxamic acid;
hexylisophthalodihydroxamic acid;
nonylbenzodihydroxamic acid;
dodecylbenzotrihydroxamic acid;
pentadecylterephthalodihydroxamic acid;
pentadecylterephthalotrihydroxamic acid;
tricosylterephthalodihydroxamic acid;
tricosylterephthalotrihydroxamic acid;
1-benzyl-2,4-benzodihydroxamic acid;
2,8-naphthodihydroxamic acid;
1,3,5-naphthotrihydroxamic acid;
cyclohexylterephthalodihydroxamic acid;

tetrahydronaphthalodihydroxamic acid;
2,2-bis-(p-phenylhydroxamic acid) propane;
bis-(p-phenylhydroxamic acid) methane, 1-chloro isothalodihydroxamic acid;
4-bromo-1,3,5-trihydroxamic acid;
3-hydroxyterephthalodihydroxamic acid;
3-nitroterephthalodihydroxamic acid;
1-carboxyl-2,4-benzohydroxamic acid;
2,8-anthracenetrihydroxamic acid;
4,4$^1$-biphenyldihydroxamic acid;
2,2$^1$-biphenyldihydroxamic acid;
4,4$^1$-diphenylethanedihydroxamic acid;
2,2$^1$-diphenylethanedihydroxamic acid;
4,4$^1$-stilbenedihydroxamic acid;
2,2$^1$-stilbenedihydroxamic acid.

Illustrative examples of aromatic poly (nitrile sulfites) of the invention include those corresponding to the foregoing hydroxamic acids such as benzodi (nitrile sulfites) preferably those wherein the nitrile sulfite groups are in the non-ortho position on the benzene ring, i.e. the meta- and -para-position, such as isophthalodi(nitrile sulfite) and
terephthalodi(nitrile sulfite);
benzotri(nitrile sulfites) such as
1,3,5-benzotri(nitrile sulfite),
benzotetra(nitrile sulfites) such as
pyromellitotetra (nitrile sulfite) and prehnitrotetra (nitrile sulfite);
2,4-di(nitrile sulfite) m-xylene;
2,5-di(nitrile sulfite) p-xylene;
1,4-di(nitrile sulfite) o-xylene;
2,4-di(nitrile sulfite)-1-methylbenzene;
2,4-di-(nitrile sulfite)-1-methylbenzene;
1,3,5-tri(nitrile sulfite)-2-ethylbenzene;
1,4-di(nitrile sulfite)-2-nonylbenzene;
2,4-di(nitrile sulfite)-6-tricosylbenzene;
2,4-di(nitrile sulfite-3-hexylbenzene;
1,3,5-tri(nitrile sulfite)-6-hexacosylbenzene;
1,3-di(nitrile sulfite)-5-benzylbenzene;
1-[2,4-di(nitrile sulfite)]-2-phenyl propane;
2,8-di(nitrile sulfite) napthalene;
1,3,5-tri(nitrile sulfite) napthalene;
1,3,5-tri(nitrile sulfite) napthalene;
1,3-di(nitrile sulfite) tetrahydronapthalene;
2,2 bis [p-di(nitrile sulfite) phenyl] propane;
bis [p-di(nitrile sulfite) phenyl] methane;
1-chloro-3,5-di(nitrile sulfite) benzene;
4-bromo-1,3,5-tri(nitrile sulfite) benzene;
3-hydroxy-1,4-di(nitrile sulfite) benzene, 3-nitro-1,4-di(nitrile sulfite) benzene;
1-carboxyl-2,4-di(nitrile sulfite)benzene;
2,8-di(nitrile sulfite) anthracene;
2,5,8-tri(nitrile sulfite) anthracene;
4,4$^1$-biphenyl di(nitrile sulfite);
2,2$^1$-biphenyl-di(nitrile sulfite);
4,4$^1$-diphenylethane-di(nitrile sulfite);
2,2$^1$-diphenylethane-di(nitrile sulfite);
4,4$^1$-stilbene-di(nitrile sulfite);
2,2$^1$-stilbene-di(nitrile sulfite).

The temperature for effecting the reaction of the aromatic hydroxamic acid and thionyl chloride may vary depending upon the particular aromatic hydroxamic acid selected but in all cases should be conducted below the decomposition temperature of the desired aromatic nitrile sulfite. Reflux temperatures can also be used as long as the reflux temperature of the particular mixture is below the decomposition temperature of the corresponding aromatic nitrile sulfite produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub-and superatmospheric pressure can be employed if desired.

Either the polyhydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred. The reaction can be conducted in the liquid phase and in many cases the aromatic poly (hydroxamic acid) will react from the solid state. Advantageously the aromatic poly (hydroxamic acid) is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is the thionyl chloride reactant, an excess of which will partially dissolve the aromatic poly (hydroxamic acid).

The reaction is often over in less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid as the aromatic poly (hydroxamic acid) is dissolved. At the lower reaction temperatures the aromatic poly (hydroxamic acid) is generally slow to dissolve and may even come out of solution, go back into solution, etc., during the reaction.

The aromatic nitrile sulfite can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aromatic nitrile sulfite as a crude product. Alternately, prior to the filtering step, the solution can be cooled to crystallize out the product and recovered as described. The crude product can be either crystalline or liquid depending on the particular aromatic poly (nitrile sulfite) prepared. A purer product can be obtained by recrystallization techniques as, for instance, from a suitable solvent such as dichloromethane, carbon disulfide, ethyl acetate, thionyl chloride and the like, or mixtures thereof.

The following examples will serve to illustrate the present invention but are not to be construed as limiting.

EXAMPLE I

*Preparation of isophthalodi(nitrile sulfite)*

To a 300 cc. fluted, round bottom flask equipped with a reflux condenser attached to a CaCl$_2$ drying tube, were added 9.8 g. (0.050 mole) of isophthalodihydroxamic acid and 165 g. (1.35 moles) of thionyl chloride. The reaction mixture was stirred mechanically and heated to a maximum temperature of 45° C. for one hour. The resulting solution was filtered and the thionyl chloride removed under reduced pressure. There was obtained 14.4 g. of an isophthalodi(nitrile sulfite) product containing small amounts of impurities and having a melting point of 104–107° C. Recrystallization from carbon disulfide gave white crystals having a melting point of 118–119° C.

Analysis:

|  | Calc'd for $C_8H_4N_2O_6S_2$ | Found |
| --- | --- | --- |
| Percent C | 33.33 | 34.03 |
| Percent H | 1.40 | 1.54 |
| Percent N | 9.72 | 9.32 |
| Percent S | 22.25 | 22.00 |

The infrared spectrum (Nujol mull) of the recrystallized material was determined and showed a significant absorption peak at 6.22 microns, characteristic of conjugated C=N stretching vibrations, and a significant band in the 8.17 micron region characteristic of cylic sulfites.

EXAMPLE II

*Preparation of terephthalodi (nitrile sulfite)*

To a 300 cc. fluted, round bottom flask equipped with a reflux condenser attached to a $CaCl_2$ drying tube, were added 9.8 g. (0.050 mole) of a terephthalodihydroxamic acid and 121 g. (1.01 moles) of thionyl chloride. The reaction mixture was stirred mechanically and heated to a maximum temperature of 45° C. for two hours. The resulting solution was filtered and the thionyl chloride removed under reduced pressure. There resulted 14.2 g. (99%) of terephthalodi(nitrile sulfite) containing small amounts of impurities and having a melting point of 139° C. (dec.). Recrystallization from dichloromethane gave white crystals, M.P. 143° C. (dec.).

Analysis:

|  | Calc'd for $C_8H_4N_2O_5S_2$ | Found |
|---|---|---|
| Percent C | 33.33 | 33.72 |
| Percent H | 1.40 | 1.54 |
| Percent N | 9.72 | 9.10 |
| Percent S | 22.25 | 22.30 |

The infrared spectrum (Nujol mull) of the recrystallized material showed a significant band at 6.22 microns, characteristic of a conjugated C=N stretching vibration, and significant absorption in the 8.06 micron region characteristic of cyclic sulfites.

EXAMPLE III

Fifty grams of an 85:15 mixture of isophthalodihydroxamic acid and terephthalodihydroxamic acid was added to 298 g. of thionyl chloride at room temperature with mechanical stirring. The mixture was warmed to 45° C. where the solid dissolved almost completely and vigorous gas evolution was noted. After one hour at 45° C. and removal by filtration of a small amount of insoluble matter, the filtrate was chilled at −10° C. for several hours. Filtration of the cold mixture afforded 40 g. (52%) of a mixture of iso- and terephthalodi (nitrile sulfites), M.P. (dec.) 105–107° C. A second crop of less pure disulfites was obtained by complete evaporation of the thionyl chloride: 30.5 g., M.P. (dec.) 95–98° C. Total yield, 91.5%.

It is claimed:

1. The compound having the structure:

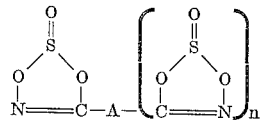

wherein A is aromatic hydrocarbon of 1 to 3 aromatic hydrocarbon rings and *n* is an integer of 1 to 3.

2. The compound of claim 1 wherein A is an aromatic hydrocarbon containing 6 to 12 carbon atoms.

3. The compound having the structure:

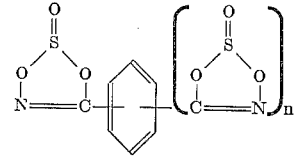

wherein *n* is an integer of 1 to 3.

4. The compound of claim 1 wherein *n* is 1.
5. Terephthalodi(nitrile sulfite).
6. Isophthalodi(nitrile sulfite).

No references cited.

HENRY R. JILES, *Acting Primary Examiner.*

ALTON D. ROLLINS, *Assistant Examiner.*